United States Patent
Michel

(10) Patent No.: US 8,851,493 B2
(45) Date of Patent: Oct. 7, 2014

(54) SUSPENSION SYSTEM FOR A WHEEL SUSPENSION OF A MOTOR VEHICLE

(71) Applicant: Audi AG, Ingolstadt (DE)

(72) Inventor: Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/833,332

(22) Filed: Mar. 15, 2013

(65) Prior Publication Data

US 2013/0241168 A1    Sep. 19, 2013

(30) Foreign Application Priority Data

Mar. 16, 2012  (DE) .......................... 10 2012 005 395

(51) Int. Cl.
 *B60G 11/18*  (2006.01)
 *B60G 17/02*  (2006.01)
(52) U.S. Cl.
 CPC .......... *B60G 17/025* (2013.01); *B60G 2500/20* (2013.01)
 USPC ............................. 280/124.166; 280/124.137
(58) Field of Classification Search
 USPC ........... 280/5.511, 124.13, 124.106, 124.135, 280/124.137, 124.149, 124.166, 124.17
 See application file for complete search history.

(56) References Cited

U.S. PATENT DOCUMENTS

| | | | | |
|---|---|---|---|---|
| 4,796,911 A * | 1/1989 | Kuroki et al. | ............... | 280/5.511 |
| 4,869,480 A | 9/1989 | Beutin et al. | | |
| 5,074,581 A * | 12/1991 | Matsuoka | ................. | 280/124.13 |
| 5,876,148 A * | 3/1999 | Kraps | ............................ | 403/119 |
| 6,832,772 B2 * | 12/2004 | Conover | ................. | 280/124.106 |
| 7,665,745 B2 * | 2/2010 | Bjorkgard | ..................... | 280/86.5 |
| 7,984,918 B2 * | 7/2011 | Jung | ....................... | 280/124.106 |
| 8,177,245 B2 * | 5/2012 | Bitz et al. | ............... | 280/124.128 |
| 8,511,697 B2 * | 8/2013 | Ohletz et al. | ............. | 280/124.13 |
| 2002/0195791 A1 | 12/2002 | Schmidt et al. | | |
| 2009/0008887 A1 * | 1/2009 | Buma | ......................... | 280/5.511 |
| 2010/0013175 A1 * | 1/2010 | Maeda et al. | ............... | 280/5.511 |
| 2011/0278811 A1 * | 11/2011 | Ohletz et al. | ............ | 280/124.106 |
| 2011/0278812 A1 * | 11/2011 | Ohletz et al. | ............ | 280/124.106 |

FOREIGN PATENT DOCUMENTS

| | | |
|---|---|---|
| DE | 3730334 | 3/1989 |
| DE | 19508611 | 9/1996 |
| DE | 195 13 467 | 10/1996 |
| DE | 10130401 | 1/2003 |
| DE | 10148095 | 4/2003 |
| DE | 102009005899 | 7/2010 |
| EP | 0648625 | 4/1994 |

* cited by examiner

*Primary Examiner* — Paul N Dickson
*Assistant Examiner* — Robert A Coker
(74) *Attorney, Agent, or Firm* — Henry M. Feiereisen LLC

(57) ABSTRACT

An axle actuator for a wheel suspension of a motor vehicle includes an output lever, a torsion bar spring acting on a wheel side upon the output lever, and a rotary actuator adapted to adjust a tension of the torsion bar spring. A coupler links the output lever to a wheel guide element of the wheel suspension and is configured as a spring with defined spring rate and connected by joints with the output lever and the wheel guide element.

19 Claims, 3 Drawing Sheets

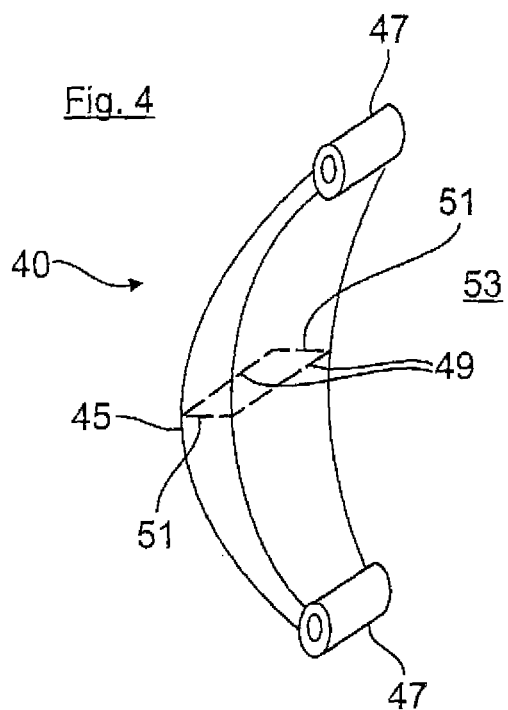
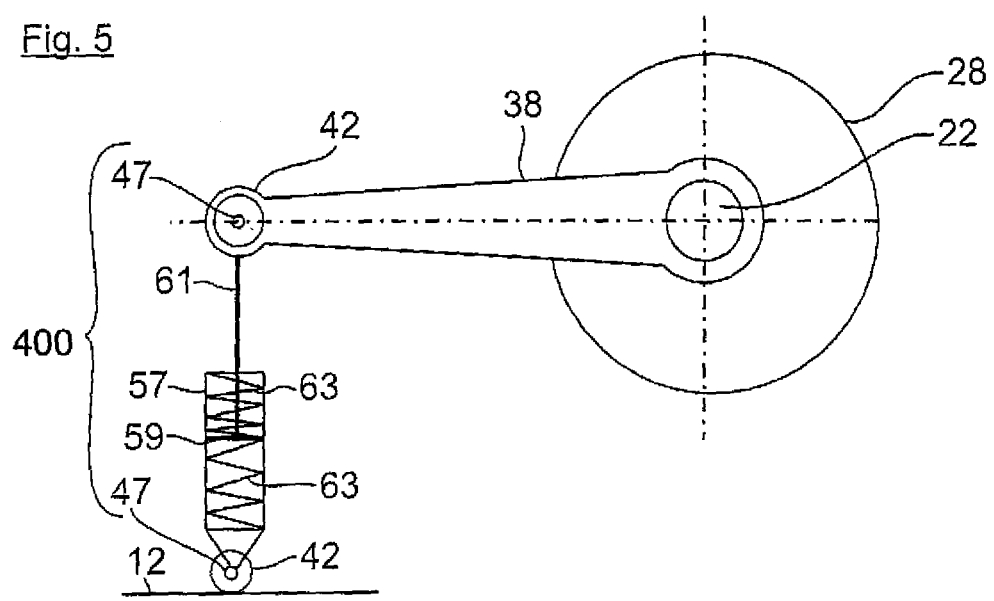

SUSPENSION SYSTEM FOR A WHEEL SUSPENSION OF A MOTOR VEHICLE

CROSS-REFERENCES TO RELATED APPLICATIONS

This application claims the priority of German Patent Application, Serial No. 10 2012 005 395.9, filed Mar. 16, 2012, pursuant to 35 U.S.C. 119(a)-(d), the content of which is incorporated herein by reference in its entirety as if fully set forth herein.

BACKGROUND OF THE INVENTION

The present invention relates to an axle actuator for a wheel suspension of a motor vehicle. An axle actuator of this type may find application for a front axle as well as for a rear axle.

It would be desirable and advantageous to provide an improved axle actuator to obviate prior art shortcomings and to allow adjustment of the total spring rate in a simple and yet reliable manner.

SUMMARY OF THE INVENTION

According to one aspect of the present invention, an axle actuator for a wheel suspension of a motor vehicle includes an output lever, a torsion bar spring acting on a wheel side upon the output lever, a rotary actuator adapted to adjust a tension of the torsion bar spring, and a coupler linking the output lever to a wheel guide element of the wheel suspension, the coupler being configured as a spring with defined spring rate and connected by joints with the output lever and the wheel guide element.

In accordance with the present invention, the output lever of the axle actuator is not directly linked to the wheel guide element but rather connected thereto via a coupler. The coupler is connected to the wheel guide element and the output lever by joints, such as e.g. ball-and-socket joints or other pivoting joints. Thus, the connection between the coupler and the output lever is not rigid, i.e. without spring characteristic, but rather configured in the form of a spring element with defined spring rate. As a result, the torsion bar spring is connected in series and superimposed with the spring element, thereby lowering the spring rate of the suspension system and reducing torsional stress upon the torsion bar spring. As a consequence, a torsion bar spring may, optionally, be used that has a smaller diameter and is lighter in weight.

The torsion bar spring may be designed in the form of a nested torsion spring system, comprised of a spring tube and a solid rod spring. The system is thus expanded with the coupler as a third resilient component. As a result, while geometric dimensions can be maintained, i.e. the length of the torsion spring system, the total spring rate can be corrected downwards. Therefore, the axle actuator may also be installed in smaller vehicle models that require a reduction in the total spring stiffness of the wheel suspension.

According to another advantageous feature of the present invention, the coupler may be configured in the form of a C-shaped flexible spring having spring mounts hinged by the joints to the output lever and the wheel guide element. Advantageously, the coupler can be configured as a leaf spring. The coupler can thus be constructed with optimized weight to meet weight considerations. The C-shaped flexible spring may have a crescent-shaped side contour with a midsection defined by a substantial material thickness which tapers towards the spring mounts. In this way, the coupler can essentially be constructed as a flexural member of same bending stress so as to evenly disperse stress during travel of the vehicle. The presence of the jointed connections prevents interfering tilting moments originating from the wheel guide elements during travel from impacting the coupler configured as flexible spring.

According to another advantageous feature of the present invention, the C-shaped flexible spring may be made from a flat profile having at least in part a rectangular cross section. The flat profile can advantageously be aligned, when installed, in such a way that a flat side thereof faces an installation space which is bounded by the flexible spring or leaf spring in a C-shaped manner. As a result, an additional chassis element may be disposed there to optimize this package space.

According to another advantageous feature of the present invention, the coupler can extend in a vertical direction between its points of articulation. Likewise, both spring mounts of the coupler may be positioned in vertical alignment in the design position.

According to another advantageous feature of the present invention, the flexible spring may be made of a spring material. For reasons of weight optimization, the coupler may be made of a fiber composite, e.g. carbon-fiber reinforced plastic.

As stated above, the torsion bar spring defines together with the coupler in the form of a spring element an accumulator spring system with predefined total spring constant. The incorporation of an output lever as a rigid structure without spring characteristic, i.e. no impact on the total spring rate, in the load path between the torsion bar spring and the coupler is especially advantageous. For that purpose, it is beneficial to manufacture the output lever initially as separate rigid structure and then to connect the output lever with the torsion bar spring by interference fit and/or friction fit, as opposed to an integral one-piece construction of the output lever and torsion bar spring. As a result of the present invention, the output lever can be manufactured with optimal stiffness independently from the compliant torsion bar spring. The output lever between the coupler and the torsion bar spring can therefore be used to assume the torque transmission during travel from the torsion bar spring to the coupler. This can be realized in the absence of any additional accumulation or delivery of spring work.

According to another advantageous feature of the present invention, the torsion bar spring is oriented in alignment in vehicle transverse direction, whereas the output lever extends in vehicle longitudinal direction. The lever arm length of the output lever is sized to effect the torque transmission between the torsion bar spring and the coupler.

According to another advantageous feature of the present invention, the coupler may be configured as a telescopic spring having a casing linked to one component, a piston linearly guided for movement in the casing in both directions in opposition to a spring force, and a coupler linking the piston to another component. In order for the telescopic spring to be able to transmit tractive forces and compressive forces, the coupler has two spring elements arranged in the casing and acting on the piston in opposite directions.

According to another advantageous feature of the present invention, the output lever and the rotary actuator can be positioned on a side of the axle actuator in confronting relationship to the vehicle wheel, when viewed in vehicle transverse direction, with the torsion bar spring being configured as a spring tube extending from the rotary actuator onward and connected in driving relationship with a solid rod on an end distal to the rotary actuator, wherein the solid rod is sized to extend through the rotary actuator and connected indirectly or directly to the output lever.

According to another advantageous feature of the present invention, the torsion bar spring and the coupler can define an accumulator spring system which interacts with a support spring connected in parallel to the wheel suspension. The support spring and the torsion bar spring with the coupler in the form of a flexible spring define hereby for the suspension system a total spring rate which can be best suited to different vehicle types and vehicle weights.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 is a perspective illustration of the coupler; and

FIG. 5 is a side view of a coupler constructed in the form of a telescopic spring.

DETAILED DESCRIPTION OF PREFERRED EMBODIMENTS

Figure 1:
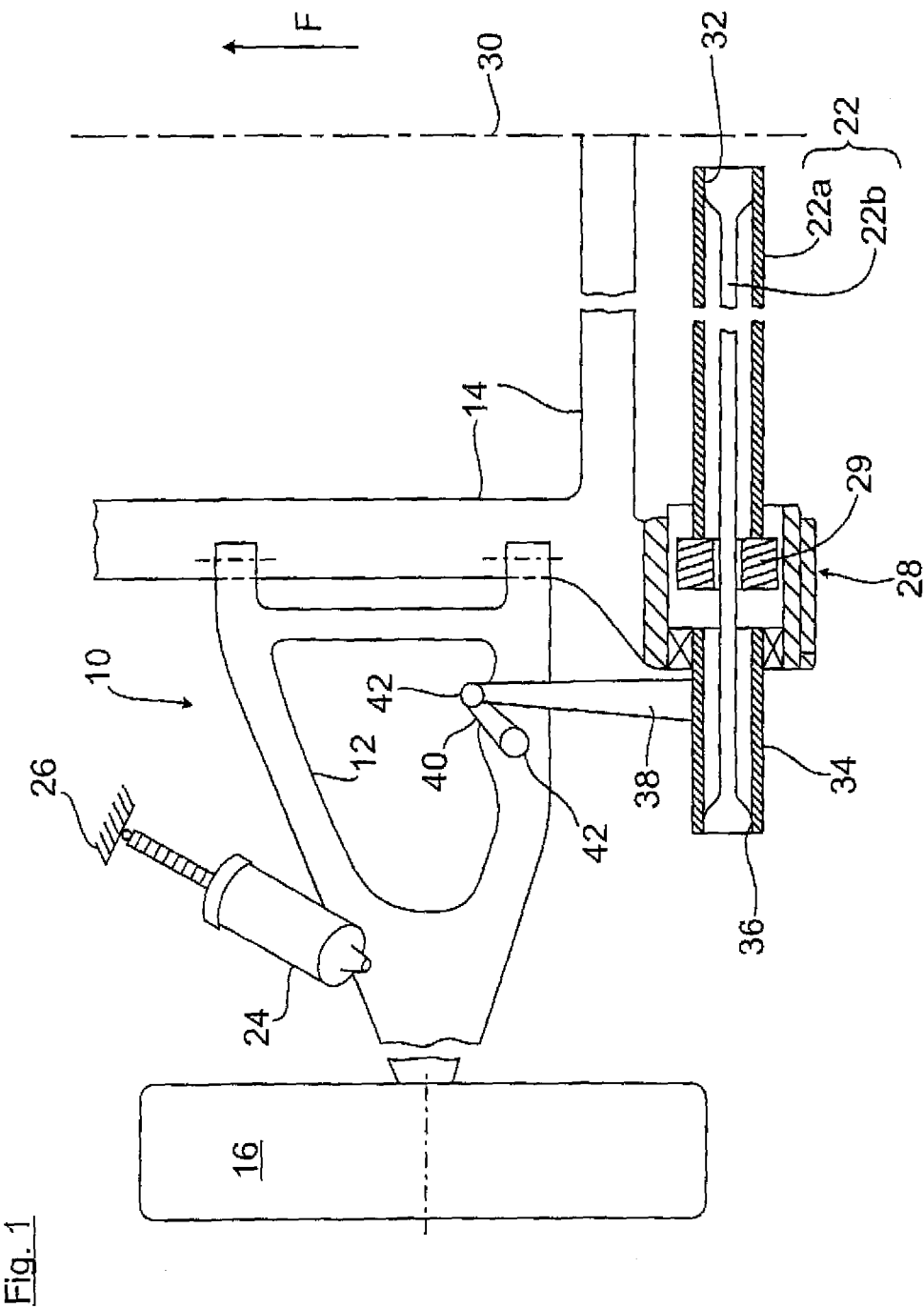
FIG. 1 is a plan view onto a lower plane of a left-hand side wheel suspension of a rear, axle of a motor vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a plan view onto a lower plane of a left-hand side wheel suspension with axle actuator, generally designated by reference numeral 10, for a rear axle of a motor vehicle. The right-hand side of the wheel suspension 10 is a mirror image and thus has been omitted for the sake of simplicity. The wheel suspension 10 includes a lower transverse control arm 12 which is articulated to an auxiliary frame 14, shown only in part, and to a not shown wheel carrier for a rear wheel 16. The upper transverse control arm or suspension arm to guide the wheel carrier is not shown.

Figure 2:
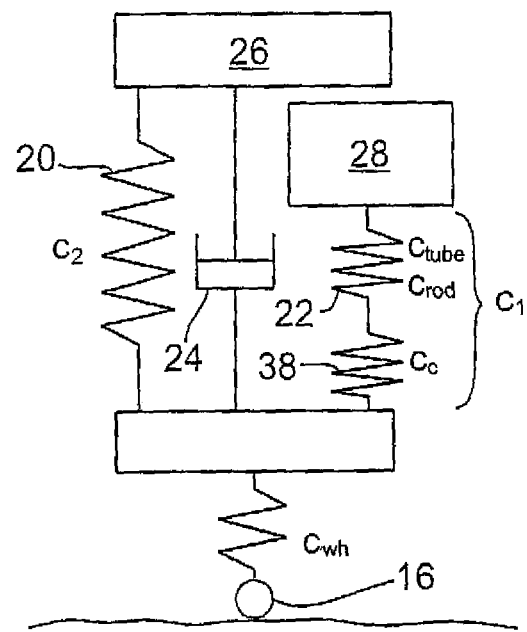
FIG. 2 is an equivalent circuit diagram of the suspension system of FIG. 1, depicting individual spring rates that together substantially determines the total spring rate.

The wheel suspension 10 has a split spring-damper system with a telescopic shock absorber 24 which is separated from a support spring 20, shown only in the equivalent circuit diagram of FIG. 2. According to FIG. 1, the axle actuator according to the invention includes a torsion bar spring 22 as accumulator spring which extends in vehicle transverse direction. The shock absorber 24 is supported with its lower end upon the lower transverse control arm 12 and with its upper end to a body structure 26 of the motor vehicle, with also an auxiliary frame 14 being mounted to the body structure 26 via vibration-isolating bearings.

The torsion bar spring 22 includes a radially outer spring tube 22a which extends from an electromotive rotary actuator 28, mounted to the auxiliary frame 14, inwardly to just shy of the indicated vertical vehicle length center plane 30 and is connected there in driving relationship with a solid rod 22b of spring steel by a plug connection 32 for example. The solid rod 22b extends radially inwardly towards the vehicle outer side, extends through the rotary actuator 28, and is secured to a further outwardly positioned guide bushing 34 by a plug connection 36. The guide bushing 34 is rotatably mounted in the rotary actuator 28 and supports an output lever 38 which projects forwardly in radial relationship to the transverse control arm 12 in travel direction F of the motor vehicle and is articulated to the transverse control arm 12 by joints 42 and a substantially vertically oriented coupler 40.

The rotary actuator 28 includes a driving electric motor 29, indicated schematically only, and a transmission with high gear ratio, e.g. a harmonic drive gear system or cycloid gear system. The transmission has an output element in driving relationship with the spring tube 22a. The length of the effective torsion bar spring 22 is thus determinative for the spring rate and is defined cumulatively by the length of the spring tube 22a from the rotary actuator 28 to the plug connection 31 and the length of the solid rod 22b between the plug connections 32, 36.

Figure 3:
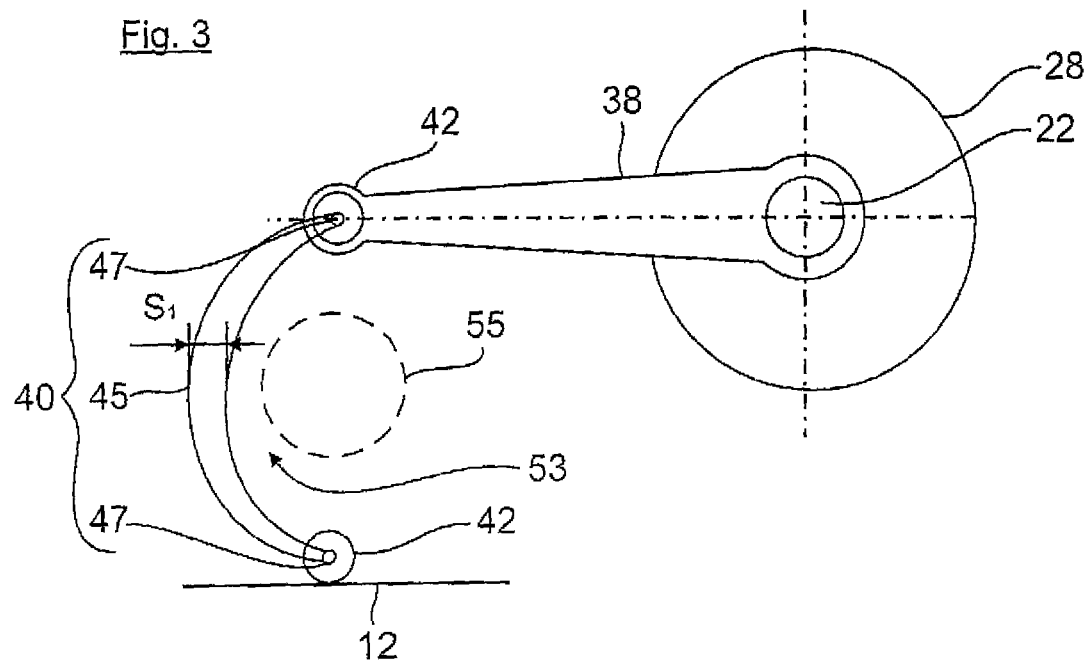
FIG. 3 is a side view of an axle actuator with a coupler constructed in the form of a flexible spring.

As shown in FIGS. 3 and 4, the coupler 40 is constructed as a flexible spring of spring steel and has a spring rate which is superimposed in series connection with the torsion bar spring 22. Currently preferred is a configuration of the coupler 40 as flexible carrier of same bending stress. As shown in FIGS. 3 and 4, the coupler 40 is realized in the form of a C-shaped leaf spring having spring mounts 47 articulated to the output lever 38 and the wheel guide element 12 via joints 42. As shown in particular in FIG. 3, the C-shaped leaf spring has a generally crescent-shaped side contour with a midsection 45 of a material thickness $s_1$ which tapers towards the respective spring mounts 47. In addition, as shown in FIG. 4, the C-shaped leaf spring is made of uniform material in the form of a single-piece flat profile, advantageously of a fiber composite. The flat profile has a rectangular cross section with opposing flat sides 49 and opposing narrow sides 51. The C-shaped leaf spring is installed in vertical orientation such that one of the flat sides 49 faces a package space 53 bounded in a C-shaped manner by the leaf spring. The space 53 can be used for receiving a chassis element 55, as indicated in FIG. 3 by a dashed line.

The coupler 40 has a cross section which steadily decreases from its midsection 45 in a direction of the joints 42 so that the coupler 40 is subject to substantially same bending stress along its longitudinal extension. Such a coupler 40 of same bending stress provides optimal force flux conditions and saves material. Overall, the cross sectional profile of the coupler 40 can be suited to the space conditions at hand.

To reliably transmit tractive and compressive forces in the load path between the rotary actuator 28 and the vehicle wheel 16, the output lever 28 placed between the coupler 40 and the torsion bar spring 22 is configured as a completely rigid structure with no spring characteristics so as to have no influence on the total spring constant. As a consequence, the output lever 38 serves thus solely to transmit torque but does not assume any accumulation or delivery of spring work. According to FIG. 3, the output lever 38 represents a separate structure which can be coupled to the torsion bar spring 22 by a press-fit or not shown splined connection in a force-locking and/or formfitting manner. Both spring mounts 47 of the C-shaped coupler 40 are arranged above one another in vertical alignment.

Referring now to FIG. 5, there is shown another embodiment of a coupler, generally designated by reference numeral 400. Parts corresponding with those in FIG. 3 are denoted by identical reference numerals and not explained again. The description below will center on the differences between the embodiments. In this embodiment, the coupler 400 is constructed in the form of a telescopic spring, instead of a flexible spring. The telescopic spring has a generally two-part construction, comprised of a casing 57 which is articulated to the transverse control arm 12 and a piston 59 which is received in the casing 57 for linear movement. The piston 59 is articulated to the output lever 38. In order to be able to transmit both tractive forces and compressive forces, the casing 57 accommodates two spring elements 63 in confronting relationship which act on the piston 59 in opposite directions.

Using the rotary actuator 38, its electric motor 29, which operates in both rotation directions, can be activated for example to increase or decrease in relation to a basic configuration the pretension of the torsion bar spring 22 and the coupler 40 relative to the parallel support spring 20 on the basis of an electronic driving stability program according to driving-dynamics parameters in order to modify vehicle height or to resist a tendency of the vehicle for rolling or pitching motion.

FIG. 2 shows by way of an equivalent circuit diagram the interaction of the axle actuator of a wheel suspension 10. As can be seen, spring systems $c_2$ (support spring 20) and $c_1$ (torsion bar spring 22 and coupler 40 connected in series) are effective in parallel relationship between the body structure 26 of the motor vehicle and the wheel 16 or transverse control arm 12 and are determinative for the total spring rate. For sake of completeness, the spring rate $c_{wh}$ of wheel 16 or its tire is also indicated.

As a result of the series connection of the torsion bar spring 22 with the coupler 40, configured as flexible spring, the spring rate $c_1$ as accumulator spring, controlled by the rotary actuator 28, and thus the total spring rate $c_2+c_1$ can be decreased or best suited to the constructive situations at hand.

More specifically, the total spring constant of the system shown in FIG. 2 is governed by the following formula:

$$\frac{1}{c_{tot}} = \frac{1}{c_{wh}} + \frac{1}{c_{12}}, \text{ wherein } c_{12} = c_1 + c_2, \text{ and}$$

$$\frac{1}{c_1} = \frac{1}{c_{tube}} + \frac{1}{c_{rod}} + \frac{1}{c_c},$$

wherein
$c_{tot}$ total spring constant of the system,
$c_{wh}$ spring constant of wheel 16
$c_1$ spring constant of the torsion bar spring system including resilient coupler 40,
$c_2$ spring constant of support spring 20
$c_{tube}$ total spring constant of spring tube 22a,
$c_{rod}$ spring constant of solid rod spring 22b 16
$c_c$ spring constant of coupler 40

This shows that the spring stiffness of vehicle tires with $c_{wh}$, of the support spring 20 with $c_2$ and of the accumulator spring with $c_1$ enter into the calculation. When calculating the total spring constant $c_1$ of the accumulator spring, the coupler 40 configured as spring is additionally taken into account in accordance with the invention so as to establish a series connection, comprised of the spring tube 22a, solid rod spring 22b, and coupler 40. Thus, also the third fracture $1:c_c$ is considered in the above formula so that after solving the formula for $c_1$, the total spring rate for the accumulator spring is reduced compared to the prior art.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An axle actuator for a wheel suspension of a motor vehicle, comprising:
   an output lever;
   a torsion bar spring acting on a wheel side upon the output lever;
   a rotary actuator adapted to adjust a tension of the torsion bar spring; and
   a coupler linking the output lever to a wheel guide element of the wheel suspension, said coupler being configured as a spring with defined spring rate and connected by joints with the output lever and the wheel guide element.

2. The axle actuator of claim 1, wherein the coupler extends in a vertical direction.

3. The axle actuator of claim 1, wherein the coupler is a C-shaped flexible spring having spring mounts hinged by the joints to the output lever and the wheel guide element.

4. The axle actuator of claim 3, wherein the C-shaped flexible spring has a crescent-shaped side contour with a midsection defined by a material thickness which tapers towards the spring mounts.

5. The axle actuator of claim 3, wherein the flexible spring is made of a spring material.

6. The axle actuator of claim 5, wherein the spring material is a fiber composite.

7. The axle actuator of claim 3, further comprising a chassis element arranged in a space defined by the flexible spring and having a C-shaped configuration.

8. The axle actuator of claim 3, wherein the spring mounts of the flexible spring are positioned in substantial vertical alignment in a design position.

9. The axle actuator of claim 1, wherein the coupler is a leaf spring.

10. The axle actuator of claim 9, wherein the leaf spring is made from a flat profile having at least in part a rectangular cross section and defining a space which is bounded in a C-shaped manner.

11. The axle actuator of claim 10, wherein the leaf spring has a flat side facing the C-shaped space.

12. The axle actuator of claim 1, wherein the torsion bar spring and the coupler define an accumulator spring system interacting with a support spring connected in parallel to the wheel suspension.

13. The axle actuator of claim 1, wherein the output lever is configured as a rigid structure absent any spring characteristic so as to have no impact on a total spring constant, the torsion bar spring and the coupler being connected by the rigid output lever which is solely capable to transmit a torque from the torsion bar spring to the coupler without accumulation or delivery of spring work.

14. The axle actuator of claim 1, wherein the torsion bar spring is oriented in alignment in a vehicle transverse direction, and the output lever extends in a vehicle longitudinal direction.

15. The axle actuator of claim 1, wherein the coupler is configured as a telescopic spring having a casing linked to one component, a piston linearly guided for movement in the casing in opposition to a spring force, and a coupler linking the piston to another component.

16. The axle actuator of claim 15, wherein the coupler has two spring elements arranged in the casing and acting on the piston in opposite directions.

17. The axle actuator of claim 1, wherein the output lever and the rotary actuator are positioned on a side of the axle actuator in confronting relationship to the vehicle wheel, when viewed in vehicle transverse direction, said torsion bar spring being configured as a spring tube from the rotary actuator onward and connected in driving relationship with a solid rod on an end distal to the rotary actuator, said solid rod sized to extend through the rotary actuator and connected to the output lever.

18. The axle actuator of claim 1, wherein the output lever is a separate structure joined upon the torsion bar spring.

19. An axle control system, comprising a plurality of axle actuators, each axle actuator construed as set forth in claim 1, said plurality of axle actuators operatively connected to a plurality of vehicle wheels in one-to-one correspondence and generating actuation forces to functionally independently act on the vehicle wheels.

* * * * *